(12) United States Patent
Lee et al.

(10) Patent No.: US 11,288,833 B2
(45) Date of Patent: Mar. 29, 2022

(54) DISTANCE ESTIMATION APPARATUS AND OPERATING METHOD THEREOF

(71) Applicant: Samsung Electronics Co., Ltd., Suwon-si (KR)

(72) Inventors: Sangjun Lee, Suwon-si (KR); Jaewoo Lee, Hwaseong-si (KR); Wonju Lee, Suwon-si (KR); Jahoo Koo, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 55 days.

(21) Appl. No.: 16/987,452

(22) Filed: Aug. 7, 2020

(65) Prior Publication Data

US 2021/0042955 A1 Feb. 11, 2021

(30) Foreign Application Priority Data

Aug. 8, 2019 (KR) .................. 10-2019-0096914

(51) Int. Cl.
*G06T 7/70* (2017.01)
*G06T 7/00* (2017.01)
(Continued)

(52) U.S. Cl.
CPC ............. *G06T 7/70* (2017.01); *B60R 11/04* (2013.01); *B60W 60/00259* (2020.02); *G06K 9/00798* (2013.01); *G06K 9/00805* (2013.01); *G06T 7/0002* (2013.01); *B60R 2300/804* (2013.01); *G06T 2207/30256* (2013.01); *G06T 2207/30261* (2013.01)

(58) Field of Classification Search
CPC .. G06T 7/70; G06T 7/0002; B60W 60/00259; B60R 11/04; G06K 9/00798; G06K 9/00805
See application file for complete search history.

(56) References Cited

U.S. PATENT DOCUMENTS 6,873,912 B2 3/2005 Shimomura
7,566,851 B2 7/2009 Stein et al.
(Continued)

FOREIGN PATENT DOCUMENTS

JP 6451565 B2 1/2019
KR 10-1356201 B1 1/2014
(Continued)

*Primary Examiner* — Md K Talukder
(74) *Attorney, Agent, or Firm* — Harness, Dickey & Pierce, P.L.C.

(57) ABSTRACT

An apparatus, system, method, and/or non-transitory computer readable media of a distance estimation apparatus including at least one camera includes obtaining a bounding box corresponding to a target vehicle on the basis of an image obtained through the at least one camera, obtaining a first rectilinear distance to the target vehicle, obtaining a first world width on the basis of the first rectilinear distance and a width of the bounding box, obtaining a second ratio of a region, corresponding to a rear surface of the target vehicle, of a region of the bounding box on the basis of a first ratio, and calculating a second world width of the target vehicle on the basis of the second ratio, wherein the first ratio represents a ratio of the rear surface and a side surface of the target vehicle.

20 Claims, 8 Drawing Sheets

(51) Int. Cl.
    *G06K 9/00*         (2022.01)
    *B60W 60/00*     (2020.01)
    *B60R 11/04*      (2006.01)

(56)           References Cited

U.S. PATENT DOCUMENTS

| | | |
|---|---|---|
| 8,164,628 B2 | 4/2012 | Stein et al. |
| 9,758,099 B2 | 9/2017 | VanVuuren et al. |
| 9,977,974 B2 | 5/2018 | Sato et al. |
| 10,127,662 B1 | 11/2018 | Reicher et al. |
| 2008/0106462 A1 | 5/2008 | Shiraishi |
| 2020/0118283 A1* | 4/2020 | Lee .................... G06K 9/00805 |
| 2020/0238991 A1* | 7/2020 | Aragon ................ G06K 9/2054 |
| 2021/0042955 A1* | 2/2021 | Lee .................... G06K 9/00798 |
| 2021/0104058 A1* | 4/2021 | Stein .................. G06K 9/00805 |
| 2021/0110181 A1* | 4/2021 | Hsu .................... G06K 9/00791 |
| 2021/0209785 A1* | 7/2021 | Unnikrishnan ....... G01S 13/867 |
| 2021/0224560 A1* | 7/2021 | Kim .................... G01C 21/3602 |
| 2021/0237768 A1* | 8/2021 | Tateishi ............... G06K 9/6272 |
| 2021/0248392 A1* | 8/2021 | Zaheer ................ G06K 9/4628 |

FOREIGN PATENT DOCUMENTS

| | | |
|---|---|---|
| KR | 10-1568683 B1 | 11/2015 |
| KR | 10-2017-0030936 A | 3/2017 |

\* cited by examiner

DISTANCE ESTIMATION APPARATUS AND OPERATING METHOD THEREOF

CROSS-REFERENCE TO RELATED APPLICATION

This U.S. non-provisional application claims the benefit of priority to Korean Patent Application No. 10-2019-0096914, filed on Aug. 8, 2019, in the Korean Intellectual Property Office, the disclosure of which is incorporated herein in its entirety by reference.

BACKGROUND

Various example embodiments of the inventive concepts relate to a distance estimation apparatuses, systems, non-transitory computer readable media, and/or operating methods thereof, and more particularly, to an apparatus for estimating a distance to a forward vehicle using a camera, and an operating method of the apparatus.

An image photographing device including an image sensor may be included in various types of electronic devices, such as smartphones, personal computers (PCs), monitoring cameras, and vehicles, etc., or may be used as one independent electronic device.

An autonomous vehicle may detect a distance to a peripheral vehicle (e.g., other vehicles in proximity to the autonomous vehicle) by using an image sensor, and may be controlled based on the detected distance, and thus, may perform stable driving.

However, in order to recognize that a viewed object is a peripheral vehicles, autonomous vehicles mainly depend on recognizing feature information of the viewed object to determine that it is a peripheral vehicle, such as a tail light and a license plate, etc. Consequently, when the feature information is occluded due to worsened weather, traffic conditions, lighting conditions, etc., it is difficult for autonomous vehicles to recognize peripheral vehicles. Therefore, the necessity of recognizing a peripheral vehicle and estimating an accurate distance to the recognized peripheral vehicle is increasing.

SUMMARY

At least one example embodiment of the inventive concepts provides a distance estimation apparatus, which calculates a ratio of a rear region of a target vehicle from among a bounding box corresponding to the target vehicle and accurately measures a rectilinear distance and a lateral distance to the target vehicle on the basis of the calculated ratio of the rear region. Some example embodiments of the inventive concepts provide an operating method of the distance estimation apparatus, and non-transitory computer readable medium thereof.

According to an aspect of at least one example embodiment of the inventive concepts, there is provided an operating method of a distance estimation apparatus including at least one camera, the operating method including generating, using processing circuitry, a bounding box corresponding to a target vehicle based on an image obtained using the at least one camera, determining, using the processing circuitry, a first rectilinear distance to the target vehicle, calculating, using the processing circuitry, a first world width of the target vehicle based on the first rectilinear distance and a width of the bounding box, calculating, using the processing circuitry, a first ratio, the first ratio based on a width of a rear surface of the target vehicle and a width of a side surface of the target vehicle in the obtained image, calculating, using the processing circuitry, a second ratio, the second ratio corresponding to a rear surface of the target vehicle, the second ratio based on a width of the bounding box and the first ratio, calculating, using the processing circuitry, a second world width of the target vehicle based on the second ratio, calculating, using the processing circuitry, an estimated distance to the target vehicle based on the second world width and the second ratio, and controlling, using the processing circuitry, a host vehicle based on the estimated distance to the target vehicle.

According to another aspect of at least one example embodiment of the inventive concepts, there is provided a distance estimation apparatus including at least one camera configured to obtain at least one image associated with a target vehicle and processing circuitry configured to generate a bounding box corresponding to a target vehicle, determine a first rectilinear distance to the target vehicle, calculate a first world width of the target vehicle based on the first rectilinear distance and a width of the bounding box, calculate a first ratio, the first ratio based on a width of a rear surface of the target vehicle and a width of a side surface of the target vehicle in the obtained image, calculate a second ratio, the second ratio corresponding to a rear surface of the target vehicle, the second ratio based on the a width of the bounding box and the first ratio, calculate a second world width of the target vehicle based on the second ratio, calculate an estimated distance to the target vehicle based on the second world width and the second ratio, and output the estimated distance to a host vehicle.

According to another aspect of at least one example embodiment of the inventive concepts, there is provided a host vehicle apparatus including at least one camera configured to obtain at least one image associated with a target vehicle, and processing circuitry configured to generate a bounding box corresponding to a target vehicle, determine a first rectilinear distance to the target vehicle, calculate a first world width of the target vehicle based on the first rectilinear distance and a width of the bounding box, calculate a first ratio, the first ratio based on a width of a rear surface of the target vehicle and a width of a side surface of the target vehicle in the obtained image, calculate a second ratio, the second ratio corresponding to a rear surface of the target vehicle, the second ratio based on a width of the bounding box and the first ratio, calculate a second world width of the target vehicle based on the second ratio, and estimate a forward distance and a lateral distance to the target vehicle based on the second world width and the second ratio, and control the host vehicle apparatus based on the estimated forward distance and lateral distance.

BRIEF DESCRIPTION OF THE DRAWINGS

The example embodiments of the inventive concepts will be more clearly understood from the following detailed description taken in conjunction with the accompanying drawings in which.

DETAILED DESCRIPTION

Figure 1:
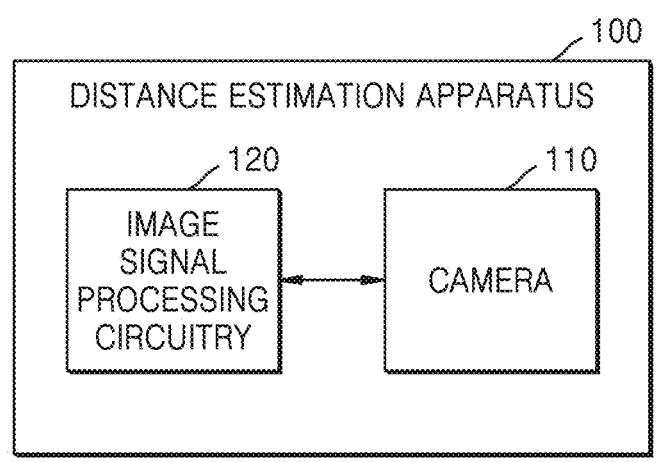
FIG. 1 is a block diagram of a distance estimation apparatus according to at least one example embodiment.

Hereinafter, various example embodiments will be described in detail with reference to the accompanying drawings. Before providing a detailed description, the terms will be described below.

A host vehicle may denote a vehicle into which a distance estimation apparatus according to at least one example embodiment is embedded. The host vehicle may be referred to as various terms such as an ego-vehicle, a self-vehicle, a self-driving vehicle, an autonomous vehicle, an autonomous driving vehicle, etc.

A target vehicle may denote at least one vehicles other than the host vehicle. In detail, the target vehicle may denote a vehicle which is photographed by a camera included in the distance estimation apparatus according to at least one example embodiment and on which distance estimation is to be performed.

An image plane may denote a two-dimensional (2D) region where the real world is projected through a camera of the distance estimation apparatus according to at least one example embodiment. The image plane may be a 2D region, and thus, may have a coordinate distinguishable in units of pixels. The coordinate may be referred to as an image coordinate. For example, when a left upper end of the image plane is set to the origin, a right direction may be expressed as an x axis and a lower direction may be expressed as a y axis.

A world coordinate may denote a coordinate for expressing the real world corresponding to an external environment of the camera of the distance estimation apparatus. According to various example embodiments, when the camera of the distance estimation apparatus is set to the origin (e.g., the camera position is set as the origin of the coordinate system), the world coordinate may be referred to as a camera coordinate (or vice versa). The camera coordinate or the world coordinate where the camera of the distance estimation apparatus is set to the origin may have the x-axis, the y-axis, and a z-axis. For example, the x axis may correspond to a front direction facing the camera, the y axis may correspond to a left direction with respect to the front of the camera, and the z axis may correspond to an upper direction with respect to the front of the camera, but the example embodiments are not limited thereto.

A full length may denote a front-rear length of a vehicle (e.g., a full length of a vehicle from the "hood" of the vehicle to the "trunk" of the vehicle if the vehicle is a passenger sedan). That is, the full length may represent a horizontal length when a camera faces a target vehicle in a lateral direction (e.g., when the camera is facing the side doors of the target vehicle).

A full width may denote a left-right length of a vehicle (e.g., the distance between the "driver-side doors" and the "passenger-side doors" of the vehicle if the vehicle is a passenger sedan). That is, the full width may represent a horizontal length when a camera faces a target vehicle in a rear direction (e.g., when the camera is facing the "trunk" of the target vehicle).

A full height may denote a vertical length of a vehicle. That is, the full height may represent a vertical length from the ground contacting a vehicle to an upper cover of the vehicle (e.g., the distance from the bottom surface of the vehicle's tires to the roof of the vehicle if the vehicle is a passenger sedan). For example, the camera of the distance estimation apparatus may be disposed at an upper cover of a vehicle, and in this case, a height of the camera may correspond to a full height.

A world width may correspond to a full width of a target vehicle in the world coordinate. Additionally, the world width may denote a widthwise length of a rear region of a target vehicle in the world coordinate.

A pixel width may denote a widthwise length of a target vehicle projected onto an image plane. For example, when a target vehicle is located in a front direction of the camera, the pixel width may represent a widthwise length of an image of a rear surface of the target vehicle in units of pixels. As another example, when a target vehicle is located at a side deviating from a front direction of the camera by a certain angle, the pixel width may represent a widthwise length of an image including all of a rear surface and a side surface of the target vehicle.

FIG. 1 is a block diagram of a distance estimation apparatus 100 according to at least one example embodiment.

Referring to FIG. 1, the distance estimation apparatus 100 may include a camera 110, and/or image signal processing circuitry (ISP) 120 (e.g., at least one image signal processor), etc., but the example embodiments are not limited thereto and may include a greater or lesser number of constituent elements.

The camera 110 may be embedded into a host vehicle and may recognize (e.g., capture an image of, sense, etc.) an external environment of the host vehicle. For example, the camera 110 may convert light, corresponding to an external environment in a front direction or several directions, into electrical energy to generate an image and may transfer the image to the ISP 120. The camera 110 may be embedded into an electronic device, or may be implemented as the electronic device, but is not limited thereto. The electronic device may be implemented as, for example, a personal computer (PC), an Internet of things (IoT) device, or a portable electronic device, etc. The portable electronic device may be, for example, a mobile telephone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, a wearable device, an augmented reality device, a virtual reality device, or the like. Additionally, in some example embodiments, the camera 110 may be embedded and/or integrated into one or more components of the host vehicle itself, for example, the windshield, the roof, etc. Moreover, in some example embodiments, the camera 110 may be two or more cameras connected to the ISP 120 and located in various locations on the vehicle, such as the front bumper and rear bumper, etc.

The ISP 120 may include processing circuitry such as hardware including logic circuits; a hardware/software combination such as at least one processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The ISP 120 may recognize peripheral vehicles proximate to the host vehicle, and may estimate a distance to each of the peripheral vehicles based on an image and/or images obtained from the camera 110. For example, the ISP 120 may recognize a peripheral vehicle from among a plurality of objects included in the obtained image, and may generate a bounding box representing the recognized vehicle. Also, the ISP 120 may calculate a ratio of an image of a rear surface of the vehicle included in the bounding box and may estimate a distance to the vehicle included in the bounding box on the basis of the calculated ratio of the image. The ISP 120 may be special purpose processing circuitry specially designed and/or specially programmed to perform the above operations. The operations will be described in detail below.

Figure 2:
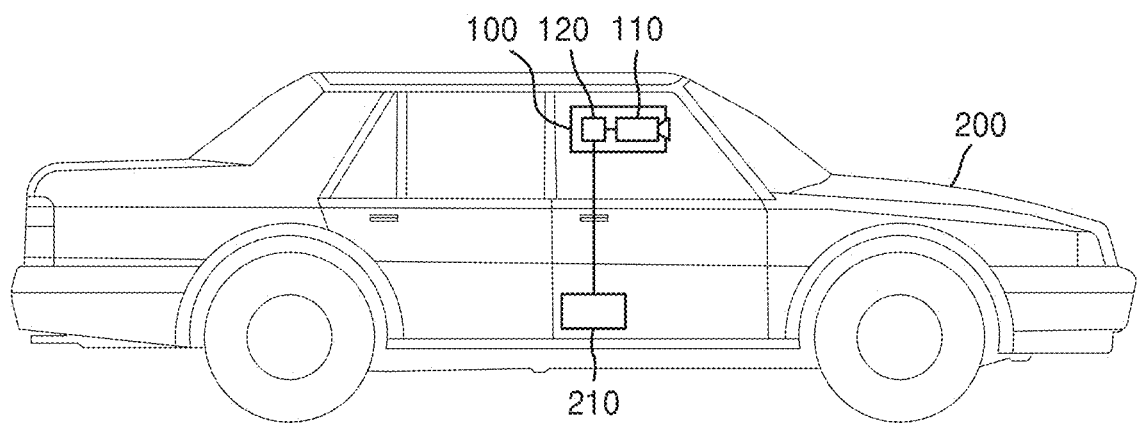
FIG. 2 is a side view of a host vehicle including a distance estimation apparatus according to at least one example embodiment.

FIG. 2 is a side view of a host vehicle 200 including a distance estimation apparatus according to at least one example embodiment. Descriptions which are the same as, or similar to, the descriptions of FIG. 1 are omitted for the sake of brevity.

Referring to FIGS. 1 and 2, the host vehicle 200 may include the distance estimation apparatus 100 and/or a vehicle controller 210, etc., but the example embodiments are not limited thereto.

The vehicle controller 210 may control the overall driving of the host vehicle 200. For example, the vehicle controller 210 may receive information indicating a rectilinear distance received from the distance estimation apparatus 100, and may control a velocity and/or direction of the host vehicle 200 on the basis of the received information. In other words, the vehicle controller 210 may control the accelerator, brakes, and/or steering of the host vehicle 200 based on the received information. The rectilinear distance may denote a distance between a target vehicle and the host vehicle 200. For example, the rectilinear distance may be expressed as an x-axis component in a world coordinate, but is not limited thereto. According to some example embodiments, the vehicle controller 210 may identify that a rectilinear distance to the target vehicle is less than a threshold distance. The vehicle controller 210 may perform control for decreasing the velocity of the host vehicle 200, and/or changing the direction the vehicle is traveling, in response to identifying that the rectilinear distance to the target vehicle is less than the threshold distance. To this end, the vehicle controller 210 may generate a control signal which indicates deceleration and may transfer the control signal to a brake system, and/or generate a control signal which indicates a change in position of the steering wheel and may transfer the control system to the steering wheel system, etc. The vehicle controller 210 may include processing circuitry such as hardware including logic circuits; a hardware/software combination such as at least one processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. In some example embodiments, the vehicle controller 210 may be integrated with and/or perform the functionality of the image signal processing circuitry 120, or vice versa.

Figure 3:
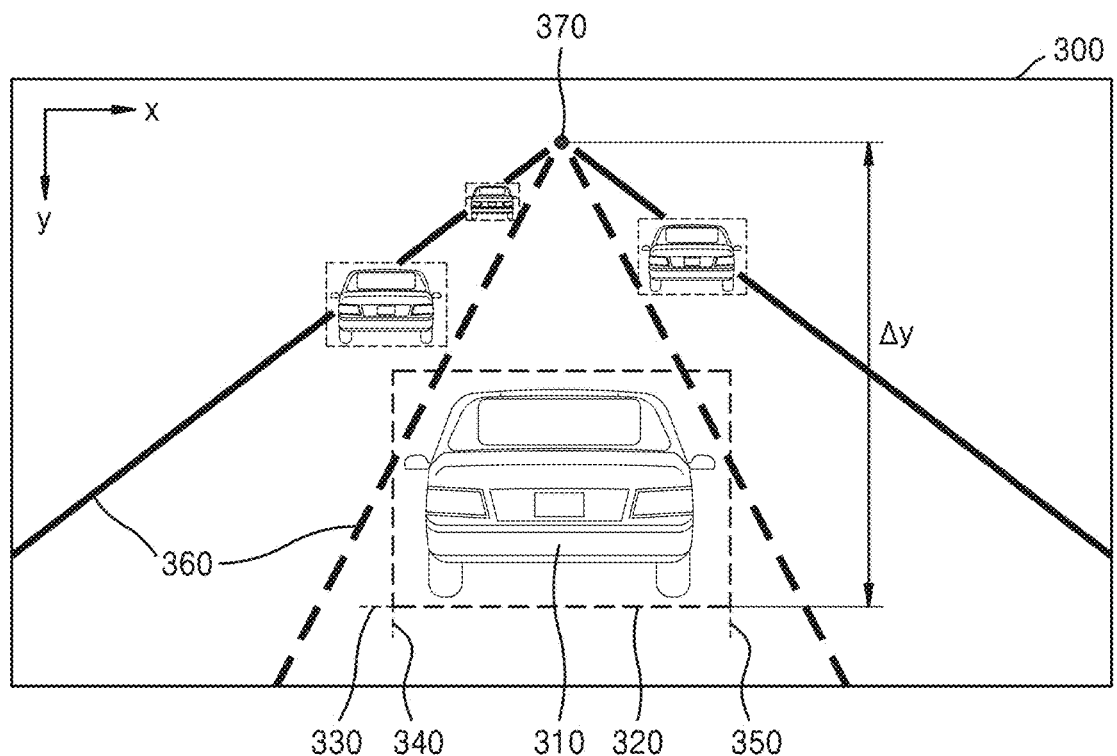
FIG. 3 illustrates an example of an image of a target vehicle projected onto a distance estimation apparatus according to at least one example embodiment.

FIG. 3 illustrates an example of an image of a target vehicle projected onto a distance estimation apparatus according to at least one example embodiment.

Referring to FIG. 3, a distance estimation image 300 may include at least one target vehicle. For convenience, description will be given based on a target vehicle 310. However, the example embodiments are not limited thereto, and for example, in some example embodiments, the distance estimation is independently performed on each of a plurality of target vehicles, etc.

According to at least one example embodiment, the target vehicle 310 may be located in a front direction of a host vehicle 200. That is, the target vehicle 310 included in the distance estimation image 300 may correspond to a rear image of the target vehicle 310.

According to various example embodiments, a bounding box 320 may be generated by the ISP 120 based on the image(s) captured by the camera 110. The bounding box 320 may denote a tetragonal region including a certain object or position information about the certain object, but the example embodiments are not limited thereto, and the bounding box 320 may be other shapes/types of regions as well, such as a polygonal region, a cubic region, etc. In a case which detects the target vehicle 310, the bounding box 320 may be displayed as a region including at least the target vehicle 310. For example, the bounding box 320 may be expressed as four edges, e.g., a bottom edge, a top edge, a left edge, and a right edge, but is not limited thereto. The bounding box 320 may be generated by the ISP 120 based on an object detection algorithm including image processing, pattern recognition, machine learning, and/or deep learning, etc. According to at least one example embodiment, the number of target vehicles is not limited to one, and thus, the number of bounding boxes may be provided in plurality.

The distance estimation image 300 may include a plurality of lanes 360 (e.g., road lanes), but is not limited thereto and may include other objects (e.g., curbs, road signs, traffic lights, pedestrians, etc.). The plurality of lanes 360 may be parallel to one another. When parallel lines in the world coordinate are projected onto an image plane, the parallel lines may concentrate on one point. The one point on which the parallel lines concentrate may be referred to as a vanishing point 370.

According to various example embodiments, a size of the target vehicle 310 may vary based on a physical distance between a camera and the target vehicle 310. For example, as the target vehicle 310 gets farther away from the camera 110, the target vehicle 310 may be closer to the vanishing point 370, and thus, a size of an object projected onto the distance estimation image 300 may decrease. As another example, as the target vehicle 310 comes closer to the camera 110, the target vehicle 310 may be farther away from the vanishing point 370, and thus, the size of the object projected onto the distance estimation image 300 may increase.

Figure 4:
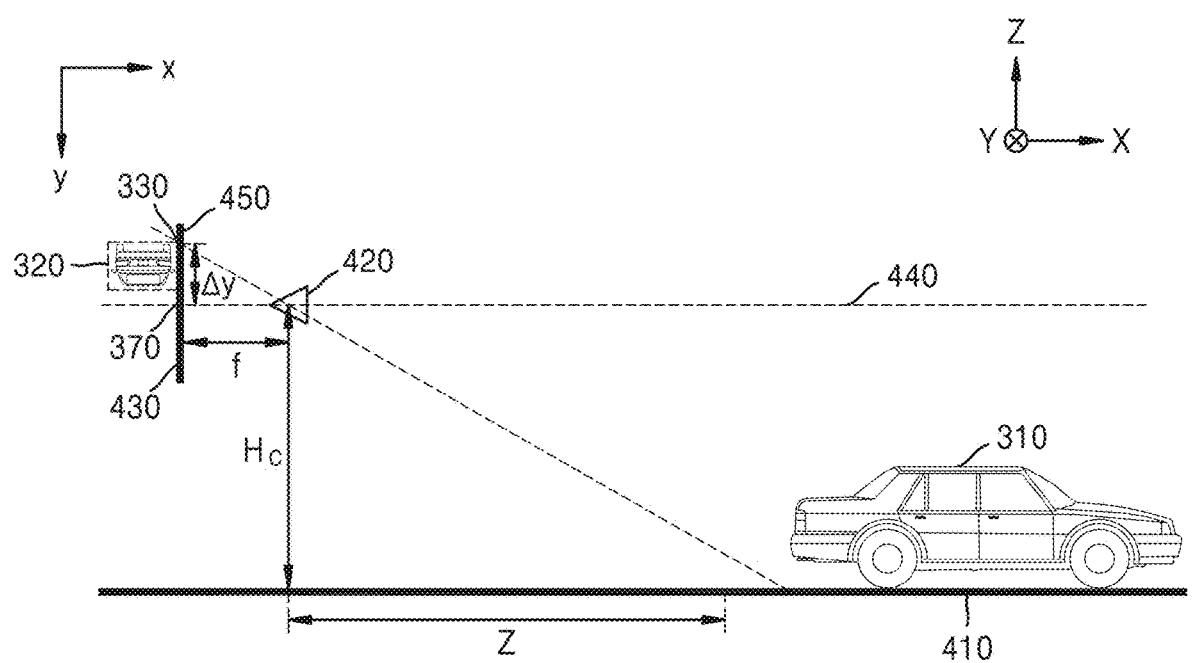
FIG. 4 illustrates an example of a side surface of each of a target vehicle and a distance estimation apparatus according to at least one example embodiment.

FIG. 4 illustrates an example of a side surface of each of a target vehicle and a distance estimation apparatus according to at least one example embodiment.

Referring to FIG. 4, a shape of a target vehicle 310 may be provided to an image sensor 430 through a lens 420 of a camera 110. For example, when the camera 110 is set to the origin of the world coordinate, the target vehicle 310 may be located in front of the host vehicle 200 an initial rectilinear distance Z along an x-axis from the lens 420. The initial rectilinear distance Z may be expressed as the following Equation (1).

$$Z = f \cdot \frac{H_C}{\Delta y} \quad \text{[Equation 1]}$$

Here, f may denote an intrinsic parameter of the camera 110 and may correspond to a focal distance, and Hc may correspond to a height of the lens 420. Δy may correspond to a pixel distance between a vanishing point 370 of an image plane and a bottom edge 330 of a bounding box 320 of the target vehicle 310.

The lens 420 may be disposed apart from a ground 410 by the height Hc of the lens 420, or in other words, the lens 420 may be at a height Hc in relation to the ground 410. For example, when the camera 110 is disposed at an upper cover (e.g., roof) of a host vehicle (the host vehicle 200 of FIG. 2), a certain separation distance may correspond to a full height of the host vehicle (the host vehicle 200 of FIG. 2). However, the present example embodiment is not limited thereto. As another example, when the camera 110 is disposed outside the host vehicle 200, the certain separation distance may correspond to a value which is less than the full height, etc.

The image sensor 430 may receive incident light through the lens 420 of the camera 110, and may generate an image plane (for example, a distance estimation image 300 of FIG. 3), but the example embodiments are not limited thereto. According to some example embodiments, the camera 110 may be a pinhole camera, but the example embodiments are not limited there. In the example when the camera 110 is a pinhole camera, a vertically inverted image of the target vehicle 310 may be projected. The vertically inverted image may be displayed as the bounding box 320 corresponding to the target vehicle 310. The lens 420 may be physically apart from the image sensor 430. A separation distance may correspond to the focal distance f.

Light 440 incident along an optical axis of the lens 420 may form the vanishing point 370 of FIG. 3. That is, a size of a y-axis component of the vanishing point 370 of FIG. 3 may be determined based on the height of the lens 420.

According to various example embodiments, Hc may be expressed as the following Equation (2).

$$H_C = (R^{-1} \cdot t)_3 \quad \text{[Equation 2]}$$

Here, R may denote a rotation matrix, and t may denote a translation vector. $(\cdot)_3$ may denote a third element of a vector.

According to various example embodiments, a method of estimating a distance on the basis of Equation (1) may be referred to as a height-based method. However, the height-based method may include a condition where the host vehicle 200 and the target vehicle 310 drive on the same plane, and due to this, an error may be caused when the height-based method is applied to a real-driving environment (e.g., real-world driving environment, or actual driving experience, etc.). Therefore, a method based on a relationship (e.g., ratio) between a pixel width of a bounding box displayed in an image plane and a full width of a target vehicle in the world coordinate will be described below.

Figure 5:
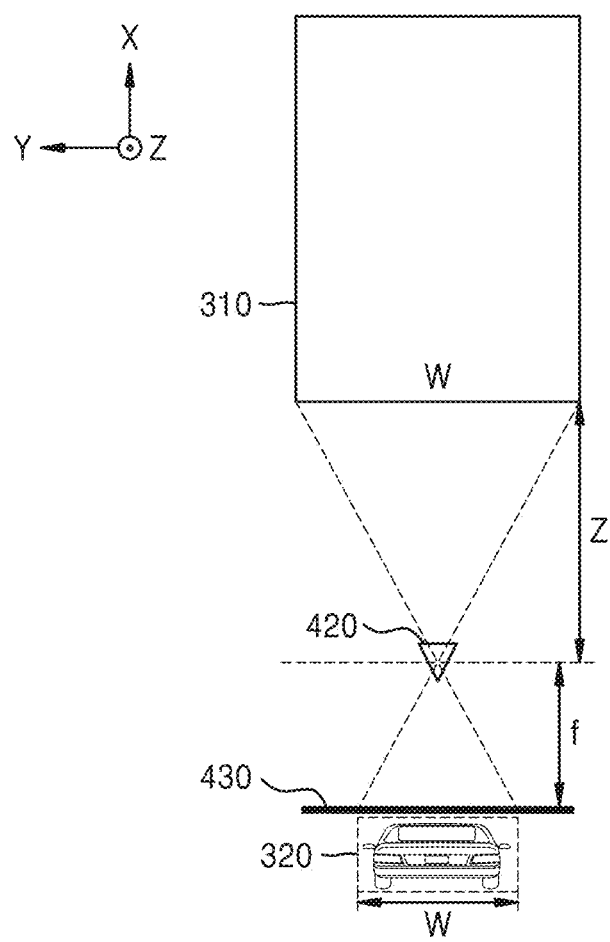
FIG. 5 illustrates an example of a birds-eye view according to at least one example embodiment.

FIG. 5 illustrates an example of a birds-eye view according to at least one example embodiment.

Referring to FIG. 5, a lens 420 and an image sensor 430 each included in a camera 110 and a target vehicle 310 are illustrated. FIG. 5 illustrates a situation when the camera 110 and the target vehicle 310 are seen from above, and descriptions which are the same as, or similar to, the descriptions of FIGS. 3 and 4 are omitted.

According to various example embodiments, the target vehicle 310 may be located in front of the host vehicle 200 at a rectilinear distance Z. When the target vehicle 310 and the host vehicle 200 drive in the same lane, the rectilinear distance Z may be calculated based on the following Equation (3).

$$Z = f \cdot \frac{W}{w} \quad \text{[Equation 3]}$$

Here, f may denote a focal distance, W may denote a world width of the target vehicle 310, and w may denote a pixel width of a bounding box generated in an image plane.

According to various example embodiments, a method of estimating a rectilinear distance by using Equation (3) may be referred to as a width-based method. However, when the target vehicle 310 drives in the same direction in an adjacent lane, and does not drive in the same lane as the host vehicle 200, the bounding box 320 may include an image of a rear surface of the target vehicle 310 and an image of a side surface of the target vehicle 310. That is, a pixel width of the bounding box 320 may not completely be mapped to a world width of the rear surface of the target vehicle 310 (e.g., the pixel width of the bounding box 320 may not be equal to the world width of the rear surface of the target vehicle 310, unlike in the scenario above where the target vehicle 310 and the host vehicle 200 are driving in the same lane), and at least a partial length (e.g., a portion) of the bounding box 320 may include a pixel length of the side surface of the target vehicle 310. Or, in other words, the pixel width of the bounding box 320 add up to the pixel width of the image of the rear surface of the target vehicle 310 and the pixel width of the image of the side surface of the target vehicle 310.

Accordingly, a ratio of the side surface of the target vehicle 310 in the image in the bounding box 320 (e.g., the ratio between the size of the side surface in the image and the width of the bounding box 320), and a ratio of the rear surface of the target vehicle in the image in the bounding box 320 (e.g., the ratio between the size of the rear surface of the target vehicle in the image and the width of the bounding box 320) may differ based on a rectilinear distance between the target vehicle 310 and the host vehicle 200. For example, the rectilinear distance between the target vehicle 310 and the host vehicle 200 is sufficiently long when the target vehicle 310 drives along in an adjacent lane, e.g., when the target vehicle 310 is in front of the host vehicle 200 and far away from the host vehicle 200. In this situation, the size of the bounding box 320 may decrease, and the image of the side surface of the target vehicle 310 in the bounding box 320 may also sufficiently decrease. In another situation, when a target vehicle 310 is driving parallel to the host vehicle 200 (e.g., the two vehicles are driving substantially side-by-side), a rectilinear distance between the host vehicle 200 and the target vehicle 310 driving along in the adjacent lane is short. In this case, a size of the bounding box 320 of an image obtained through the camera 110 may be large, but a size of the image of the side surface of the target vehicle 310 in the bounding box 320 may be far higher than that of the image of the rear surface of the target vehicle 310. That is, the bounding box 320 may include only the image of the side surface of the target vehicle 310, or may include mostly the image of the side surface of the target vehicle 310 in relation to the image of the rear surface of the target vehicle 310. A detailed method of determining and/or obtaining a world width of the target vehicle 310 driving along in an adjacent lane will be described below.

Figure 6A:
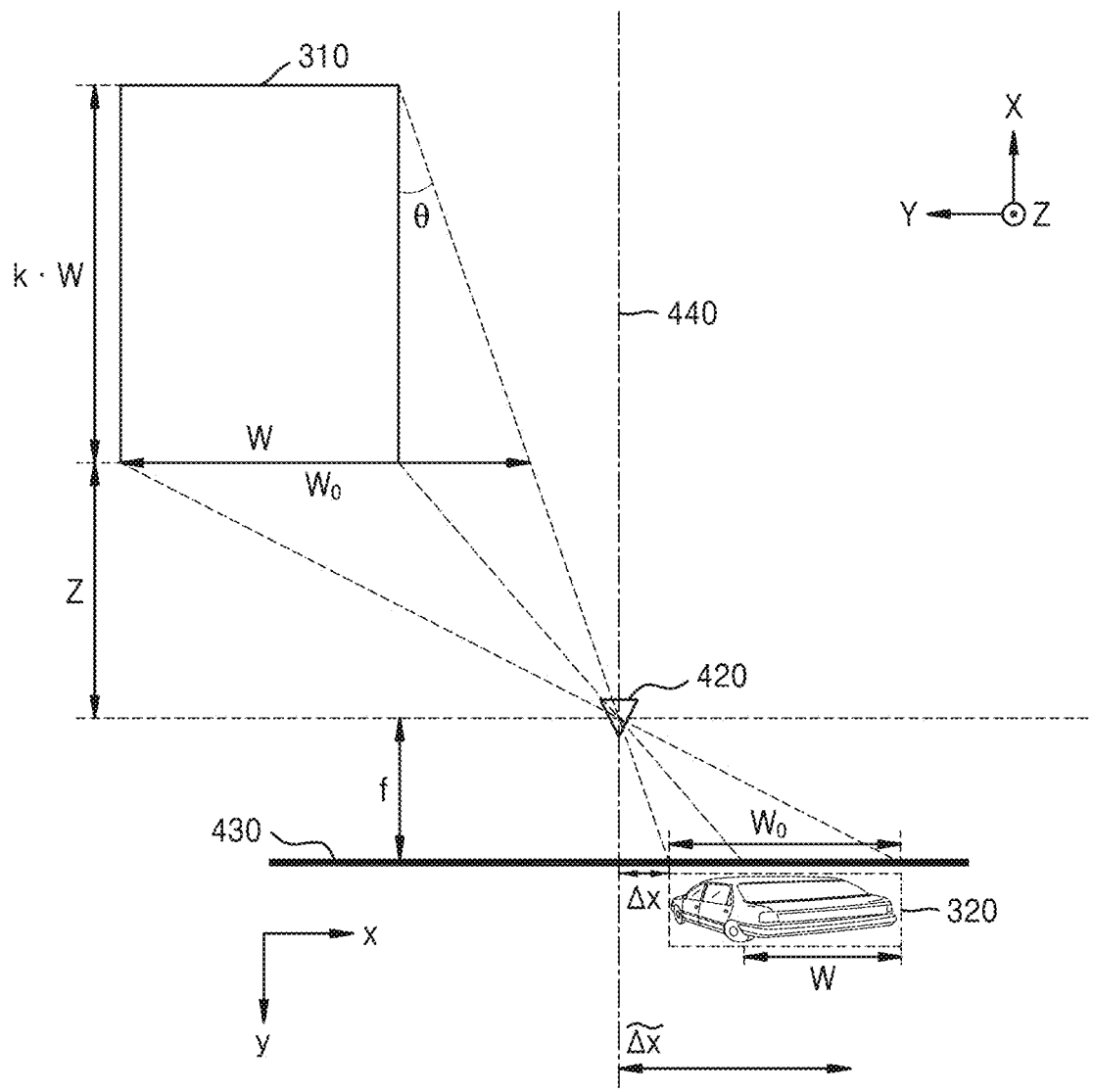
FIG. 6A illustrates another example of a birds-eye view according to at least one example embodiment.

FIG. 6A illustrates another example of a birds-eye view according to at least one example embodiment.

FIG. 6A illustrates a situation when a host vehicle 200 and a target vehicle 310 are seen from above, and descriptions which are the same as or similar to the descriptions of FIGS. 3 to 5 are omitted.

Referring to FIG. 6A, the host vehicle 200 and the target vehicle 310, which drive in the same direction, may be disclosed. It may be understood that the target vehicle 310 in front of the host vehicle 200 by $Z_0$ distance, and the target vehicle 310 drives along in an adjacent lane on the left of the host vehicle 200, but the example embodiments are not limited thereto.

A rectilinear distance Z0 may be expressed as the following Equations (4) and (5) with reference to Equation (1).

$$f:\Delta y = Z_0:H_C \quad \text{[Equation 4]}$$

$$Z_0 = f \cdot \frac{H_C}{\Delta y} \quad \text{[Equation 5]}$$

According to various example embodiments, $w_0$ may denote a pixel width of a bounding box 320 corresponding to the target vehicle 310, and $W_0$ may denote a world width of a world coordinate corresponding to the bounding box 320. A geometrical proportional relationship may be expressed as the following Equation (6), and a world width of the target vehicle 310 projected onto the host vehicle 200 may be expressed as the following Equation (7).

$$w_0:W_0 = f:Z_0 \quad \text{[Equation 6]}$$

$$W_0 = w_0 \cdot \frac{Z_0}{f} \quad \text{[Equation 7]}$$

According to various example embodiments, the host vehicle 200 may determine whether the host vehicle 200 is driving in the same lane as the target vehicle 310 or in an adjacent lane, based on an image obtained through a camera 110. In a case where light incident along the optical axis of FIG. 3 is displayed on an image coordinate, the light may correspond to an x-axis center of the image obtained through the camera 110. Δx may be defined as a small value among a pixel distance between the x-axis center and a left edge 340 of the bounding box 320 and a pixel distance between the x-axis center and a right edge 350 of the bounding box 320. For example, when the target vehicle 310 is driving to the forward left of the host vehicle 200, the bounding box 320 may be generated on the right side of the image obtained through the camera 110, and thus, Δx may correspond to a pixel distance from the x-axis center to the left edge 340 of the bounding box 320. As another example, when the target vehicle 310 is driving to the forward right of the host vehicle 200 (e.g., in front of and to the right of the host vehicle 200), the bounding box 320 may be generated on the left side of the image obtained through the camera 110, and thus, Δx may correspond to a pixel distance from the x-axis center to the right edge 350 of the bounding box 320. However, when the target vehicle 310 is driving forward in the same lane as the host vehicle 200, the bounding box 320 may be generated near a center of the image obtained through the camera 110. That is, the x-axis center may be disposed between the left edge 340 and the right edge 350 of the bounding box 320, and in this case, Δx may be defined as 0. Therefore, the host vehicle 200 may compare positions of the x-axis center and the bounding box 320 of the image obtained through the camera 110, and when Δx is 0, the host vehicle 200 may determine that the target vehicle 310 is driving forward in the same lane. When Δx is not 0, the host vehicle 200 may determine that the target vehicle 310 is driving forward in an adjacent lane.

Also, when the target vehicle 310 is driving forward in the same lane as the host vehicle 200, the bounding box 320 may include only an image of a rearward region of the target vehicle 310. In a case where a ratio between a width of an image of a rear surface of the target vehicle 310 and the width of the bounding box 320 is defined as a, when Δx is 0, a may correspond to 1. This is because the host vehicle 200 is driving behind the target vehicle 310 and obtains only an image of the rear surface of the target vehicle 310.

However, when Axis not 0, namely, when the target vehicle 310 is driving forward along an adjacent lane with respect to the host vehicle 200, a may not be 1 but may have an arbitrary value between 0 and 1. According to the above description, a may be a ratio between a width of the image of the rear surface of the target vehicle 310 in the bounding box 320 and the width of the bounding box 320, and thus, a ratio of a width of an image of a side surface of the target vehicle 310 and the width of the bounding box 320 may correspond to 1-α.

According to various example embodiments, a ratio of a full width of the target vehicle to a full length of the target vehicle may be defined as k. In this case, a proportional relationship between a ratio of a world width corresponding to a length of the rear surface of the target vehicle 310 in an image with the target vehicle 310 projected thereonto and a ratio α of the image of the rear surface of the target vehicle 310 in the bounding box 320 may be expressed as the following Equation (8).

$$W:kW\cdot\tan\theta = \alpha:1-\alpha \quad \text{[Equation 8]}$$

According to the above description, Δx may be defined as a short distance among a pixel distance between an x-axis center (an optical axis) and the left edge 340 of the bounding box 320 and a pixel distance between the x-axis center and the right edge 350 of the bounding box 320, and thus, may be expressed as $$\tan(\theta) = \frac{\Delta x}{f}.$$

Equation (8) may be represented as in the following Equation (9).

$$\alpha\left(k \cdot \frac{\Delta x}{f} + 1\right) = 1 \quad (0 < \alpha \leq 1) \quad \text{[Equation 9]}$$

According to various example embodiments, in a case where a k value is arbitrarily determined, a α value may be calculated. The k value may be a ratio of the full width of the target vehicle 310 to the full length of the target vehicle 310 and may differ for each vehicle manufacturer, vehicle classification type, and/or vehicle model, etc.

TABLE 1

| Classification | Full length [mm] | Full width [mm] | k |
|---|---|---|---|
| Compact | 3595 | 1595 | 2.253918 |
| Quasi-medium | 4550 | 1775 | 2.56338 |
| Medium | 4855 | 1865 | 2.603217 |
| Medium-sized SUV | 4700 | 1880 | 2.5 |
| Full-size | 5155 | 1935 | 2.664083 |
| Bus | 10975 | 2495 | 4.398798 |
| Refrigerated vehicle | 5440 | 1740 | 3.126437 |
| Truck | 10125 | 2495 | 4.058116 |

Referring to Table 1, it may be seen that the k value, which is a ratio of a full width to a full length (e.g., k is a ratio of a real-world width to a real-world length), differs for each vehicle type, but the full width values in Table 1 do not exceed a maximum of 2.5 m. A desired maximum full width value and a desired minimum full width value (e.g., a desired full width value range) may be set to desired values, such as values set in accordance with laws and/or regulations in various countries or territories related to the size and/or dimensions of vehicles. Therefore, the host vehicle 200 may set the k value to a desired value (and/or an arbitrary value). For example, the host vehicle 200 may set the k value to 2.5 and may then calculate the α value.

According to various example embodiments, when the host vehicle 200 sets the k value to the desired and/or arbitrary value, and calculates the α value, a world width of the target vehicle 310 may be expressed as the following Equation (10) on the basis of a proportional relationship of the bounding box 320.

$$W = \alpha \cdot W_0 \quad \text{[Equation 10]}$$

Referring to Table 1, according to various example embodiments, it may be seen that a range of the k value differs for each vehicle type. For example, in general, cars including compact cars, quasi-medium cars, medium cars, full-size cars, and medium sport utility vehicles (SUVs), it may be seen that the range of the k value is between 2.2 and 2.7. However, in trucks, buses, or refrigerated vehicles, it may be seen that the range of the k value is between 3.1 and 4.4. Therefore, when the k value corresponding to general cars is applied to special vehicles, such as trucks or buses, an error may occur in recognizing a target vehicle and may lead to serious consequences, such as traffic accidents, etc., for vehicles including an autonomous driving system. Therefore, a method for determining an appropriate k value corresponding to a vehicle type may be desired and beneficial, and additionally, when an inappropriate k value is set, a method for correcting the inappropriate k value may be desired and beneficial.

According to various example embodiments, a range of the full width shown in Table 1 may be used for determining whether correction of the k value is desired and/or needed. That is, considering that a width of a road is substantially limited and that a width of a vehicle is limited by law, a world width having an appropriate range may be set, thereby decreasing and/or preventing distance estimation based on an inappropriate k value.

According to various example embodiments, a desired minimum world width and a desired maximum world width may be set based on desired width values. For example, referring to Table 1, 1,595 mm which is a minimum full width available to a currently released vehicle may be set to the minimum world width, and 2,495 mm which is a maximum full width available to the currently released vehicle may be set to the maximum world width, but the example embodiments are not limited thereto. For example, even in a case where the target vehicle 310 is a vehicle such as a bus or a truck having a high k value, when a world width and a are calculated based on a condition where a low k value corresponding to a compact vehicle or a medium vehicle is used, a world width of the target vehicle 310 calculated based on the low k value may be less than the minimum world width or greater than the maximum world width. This may be the same as a case where a high k value is set despite the target vehicle 310 being a compactor medium vehicle. Orin other words, if a k value is used that does not match and/or correspond to the vehicle type of the target vehicle, the world width of the target vehicle may be miscalculated (e.g., outside of the acceptable world width range).

According to various example embodiments, the ISP 120 may calculate the world width of the target vehicle 310 by using a desired and/or arbitrary k value, and may determine whether the calculated world width is between the minimum world width Wmin value and the maximum world width Wmax value. When the calculated world width is greater than the minimum world width and is less than the maximum world width, the ISP 120 may determine the calculated world width as the world width of the target vehicle 310. However, when the calculated world width is less than the minimum world width or is greater than the maximum world width, the ISP 120 may determine that correction of the k value is desired and/or needed and may generate a signal indicating updating of a world width or a signal indicating correction of the k value.

According to various example embodiments, the ISP 120 may update the world width. That is, since the calculated world width is outside of a range of the minimum world width to the maximum world width, the calculated world width may be changed to the minimum world width or the maximum world width. For example, when a world width calculated based on the inappropriate k value is 3,100 mm, the ISP 120 may update the calculated world width to an updated value corresponding to 2,495 mm, which is a maximum world width value. As another example, when a world width calculated based on the inappropriate k value is 1,300 mm, the ISP 120 may update the calculated world width to an updated value corresponding to 1,595 mm, which is a value of a minimum world width value.

According to at least one example embodiment, when a world width is updated to the maximum world width value, a corrected k value may be expressed as the following Equation (11).

$$k = \frac{f}{\Delta x} \cdot \left( \frac{w_0 \cdot Z_0}{W_{MAX} \cdot f} - 1 \right) \quad \text{[Equation 11]}$$

Equation 11 may be induced through the following Equations 12 and 13. An example where a world width is updated to the maximum world width value in Equation (11) is illustrated, but the example embodiments are not limited thereto. In a case where a world width is updated to a minimum world width value, the maximum world width may be replaced with the minimum world width in Equation (11).

$$W_{MAX} + kW_{MAX} \cdot \tan\theta = W_0 \qquad \text{[Equation 12]}$$

$$W_{MAX}\left(1 + k \cdot \frac{\Delta x}{f}\right) = \frac{w_0 \cdot Z_0}{f} \qquad \text{[Equation 13]}$$

According to various example embodiments, when there is no information or insufficient information regarding a world width corresponding to the target vehicle 310, the ISP 120 may generate an update signal. That is, in a case where the target vehicle 310 is detected based on an image obtained from the distance estimation apparatus 100, the ISP 120 may determine whether the target vehicle 310 is detected using an image of a previous frame image, and whether a world width value between a minimum world width to a maximum world width is stored. If there is no world width value corresponding to the detected target vehicle 310 stored in memory, the ISP 120 may generate the update signal. The distance estimation apparatus 100 may perform operations related to determining and/or obtaining a world width of a target vehicle in response to the update signal. This will be described below with reference to FIG. 7.

According to various example embodiments, when the ISP 120 includes information about a world width W and a ratio k of a full width to a full length of the target vehicle 310, the ISP 120 may calculate a ratio α of an image width of the rear surface of the target vehicle 310 in the bounding box 320 by using the following Equation (14).

$$\alpha = 1 \Big/ \left(k \cdot \frac{\Delta x}{f} + 1\right) \qquad \text{[Equation 14]}$$

In a case where α is calculated based on Equation (14), the ISP 120 may calculate a width of an image corresponding to the rear surface of the target vehicle 310 in the bounding box 320 by using a pixel width of the bounding box 320 of the target vehicle 310.

$$w = \alpha \cdot w_0 \qquad \text{[Equation 15]}$$

Since the target vehicle 310 and the host vehicle 200 are driving along in adjacent lanes, a distance between the target vehicle 310 and the host vehicle 200 may include a component of a forward distance and a component of a lateral distance between the two vehicles. The component of the front distance may be calculated based on the following Equation (16).

$$Z_X = f \cdot \frac{W}{w} \qquad \text{[Equation 16]}$$

Also, the component of the lateral distance may be expressed as the following Equation (17).

$$Z_Y = \widetilde{\Delta x} \cdot \frac{Z}{f} \qquad \text{[Equation 17]}$$

In Equation (17), $\widetilde{\Delta x}$ may be obtained by using Δx.

$$\widetilde{\Delta x} = \Delta x + \frac{w}{2} \qquad \text{[Equation 18]}$$

In the above-described example embodiments, an example where the k value is set to a desired and/or an arbitrary value has been described, but the example embodiments are not limited thereto. The ISP 120 may identify a type of the target vehicle 310 detected through image processing (e.g., identifying the type of the target vehicle based on the shape of the vehicle or identifying characteristics of the vehicle using image processing, etc.). For example, an identifiable vehicle type may include a car, a special vehicle, a bus, etc. Examples of a car may include a compact car, a quasi-medium car, a medium car, a full-size car, a medium SUV, etc., and examples of a special vehicle may include a truck, a refrigerated vehicle, a tractor-trailer, etc. The ISP 120 may identify a type of the target vehicle 310 and may set a desired and/or predetermined k value on the basis of the identified type. For example, when the identified type corresponds to a car, the ISP 120 may set a k value to a desired and/or an arbitrary value between 2.2 and 2.7, but the example embodiments are not limited thereto. As another example, when the identified type corresponds to a special car or a bus, the ISP 120 may set a k value to desired and/or an arbitrary value between 3.1 and 4.5, but the example embodiments are not limited thereto. When the ISP 120 identifies a type of the target vehicle 310 and sets a k value within a range corresponding to the identified type, a possibility that a world width outside the minimum world width to the maximum world width is calculated may be considerably reduced.

Figure 6B:
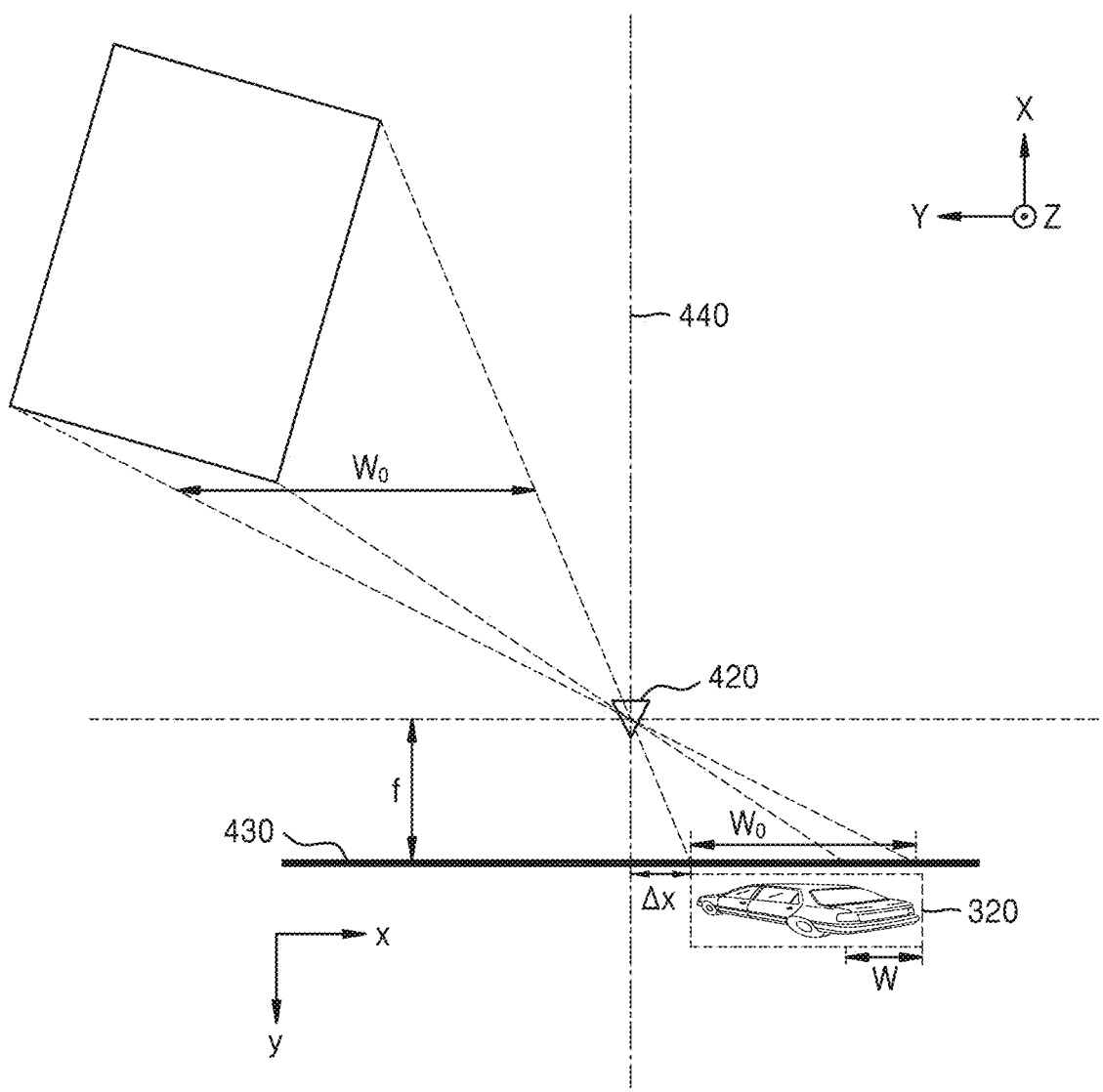
FIG. 6B illustrates another example of a birds-eye view according to at least one example embodiment.

FIG. 6B illustrates another example of a birds-eye view according to at least one example embodiment.

FIG. 6B illustrates a situation when a host vehicle 200 and a target vehicle 310 are seen from above, and descriptions which are the same as, or similar to, the descriptions of FIGS. 3 to 6A are omitted.

Referring to FIG. 6B, a driving direction of the target vehicle 310 may differ from a driving direction of the host vehicle 200. Referring to FIG. 6A, the target vehicle 310 and the host vehicle 200 may be driving in adjacent lanes, and the driving directions of the two vehicles may be an x-axis direction of the world coordinate and may be the same. However, in FIG. 6B, the driving directions of the host vehicle 200 and the target vehicle 310 may differ. Additionally, for example, when the host vehicle 200 is driving in an x-axis direction of a world coordinate, the target vehicle 310 may drive at an angle of 45 degrees in a negative y-axis direction. That is, FIG. 6B may illustrate a birds-eye view corresponding to a time at which the target vehicle 310 changes a lane to enter the same lane as the host vehicle 200.

According to various example embodiments, when the target vehicle 310 is driving while maintaining a driving angle, the ISP 120 may set a new angle θ obtained by adding or subtracting the driving angle to, or from, an angle θ of FIG. 6A. The ISP 120 may calculate the new angle θ on the basis of $$\tan(\theta) = \frac{\Delta x}{f}$$

and a Δx value changed based on the driving angle of the target vehicle 310. Other operations for determining, calculating, and/or obtaining a forward distance and a lateral distance to the target vehicle 310 may be the same as FIG. 6A, and thus, their descriptions are omitted.

In the above-described example embodiment, an example where the driving angle of the target vehicle 310 is changed has been described, but the example embodiments are not limited thereto. The example embodiments may also be applied to a case where the driving angles of the host vehicle 200 and/or the target vehicle 310 are changed (and/or changing over time).

Figure 7:
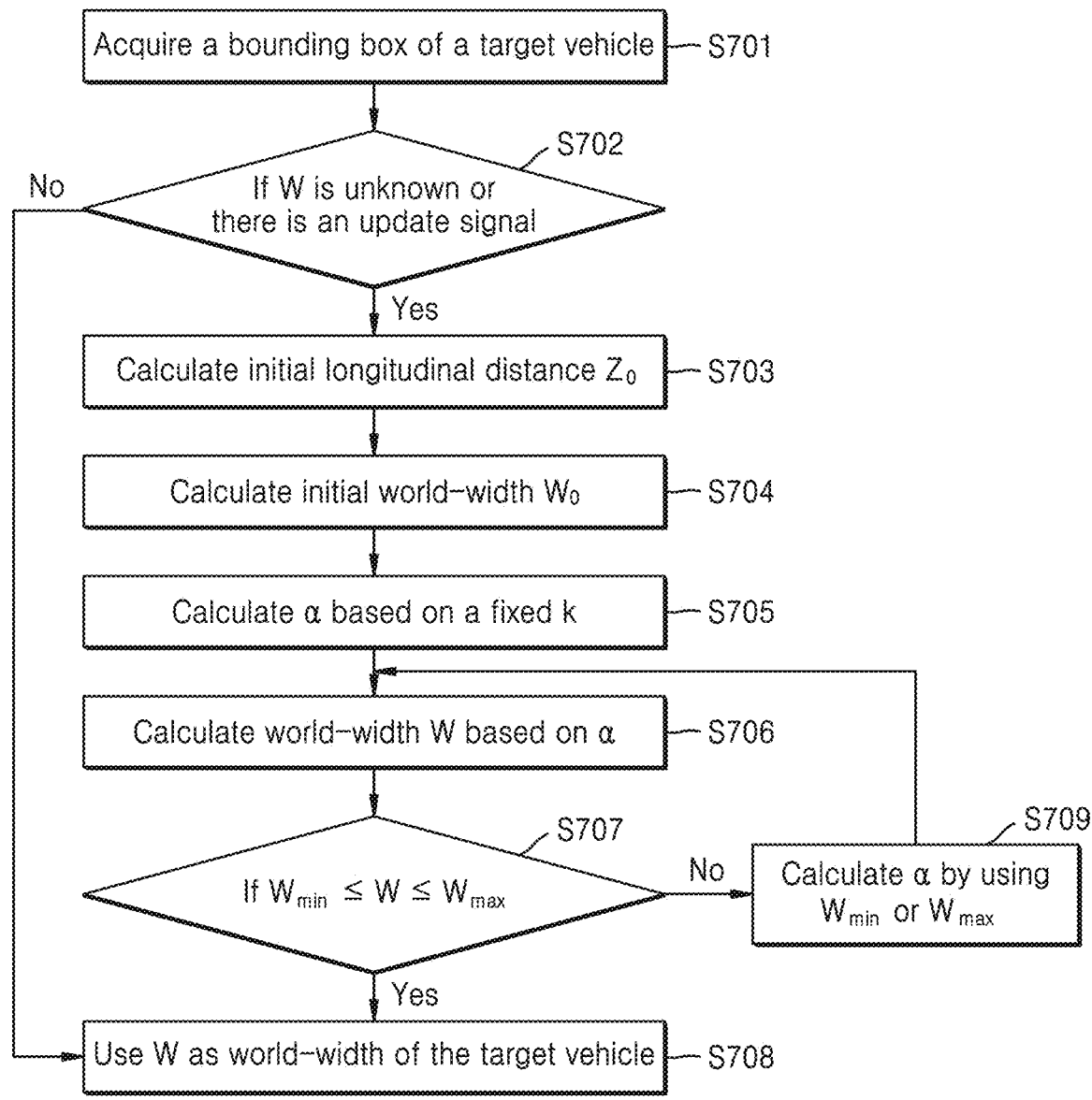
FIG. 7 is a flowchart illustrating an operation of a distance estimation apparatus according to at least one example embodiment.

FIG. 7 is a flowchart illustrating an operation of a distance estimation apparatus according to at least one example embodiment.

Referring to FIG. 7, the ISP 120 may generate, determine, calculate, and/or obtain a bounding box 320 of a target vehicle 310 in operation S701. The bounding box 320 may be performed by an artificial intelligence (AI) algorithm including machine learning and/or deep learning, etc., but the example embodiments are not limited thereto.

In operation S702, the ISP 120 may determine whether a value of a world width is known or whether the ISP 120 has received an update signal. When the ISP 120 receives the update signal, the ISP 120 may determine that a world width based on an inappropriate k value is calculated on a detected vehicle. Additionally, the ISP 120 may determine whether there is a world width value of the target vehicle 310 corresponding to the bounding box 320. The ISP 120 may determine whether the target vehicle 310 is in a previous image frame. The ISP 120 may determine that the target vehicle 310 enters a field of view of a camera 110 in a current image frame and may determine that there is no world width value. If the ISP 120 determines that a world width value is unknown and/or an update signal was received the ISP 120 proceeds to operation S703. If the ISP 120 determines that a world width value is known and the update signal was not received, then the ISP 120 proceeds to operation S708.

In operation S703, the ISP 120 may calculate an initial rectilinear distance $Z_0$ between the host vehicle 200 and the target vehicle 310. The ISP 120 may calculate the initial rectilinear distance on the basis of a geometrical proportional relationship between a height (for example, a full height) at which the camera 110 is installed, a focal distance of the camera 110, and a y-axis pixel distance from a bottom edge to a vanishing point of the bounding box 320, but the example embodiments are not limited thereto. The initial rectilinear distance may be provided based on a condition where the target vehicle 310 and the host vehicle 200 drive along in the same lane, but is not limited thereto, as discussed, for example, in connection with FIGS. 4 to 6B, etc.

In operation S704, the ISP 120 may calculate an initial world width Wo. The ISP 120 may calculate the initial world width on the basis of a geometrical proportional relationship between a widthwise pixel distance of the bounding box 320, the focal distance of the camera 110, and the initial rectilinear distance, which is calculated in operation S703, but the example embodiments are not limited thereto. The initial world width may be provided based on a condition where the target vehicle 310 and the host vehicle 200 drive in the same lane, but the example embodiments are not limited thereto, as discussed, for example, in connection with FIGS. 4 to 6B.

In operation S705, the ISP 120 may set a k value to a desired and/or arbitrary value and may calculate a α value on the basis of the k value. Here, the k value may denote a ratio of a full width to a full length of the target vehicle 310, and the α value may denote a ratio of a width occupied by an image of a rear surface of the target vehicle 310 in the bounding box 320 and the pixel width of the bounding box 320.

In operation S706, the ISP 120 may calculate a world width of the target vehicle 310 on the basis of the calculated α value.

In operation S707, the ISP 120 may determine whether the calculated world width is within an acceptable world width range, for example between a desired minimum world width and a desired maximum world width. The acceptable world width range (e.g., between the desired minimum world width to the desired maximum world width) may be based on known specifications (e.g., known width data) of a plurality of vehicles and/or a plurality of vehicle classification types. If the ISP 120 determines that the calculated world width is within the acceptable world width range, the ISP 120 proceeds to operation S708. Otherwise, the ISP 120 proceeds to operation S709.

In operation S708, the ISP 120 may determine and use the calculated world width as the world width of the target vehicle 310. Subsequently, although not shown, the ISP 120 may obtain a forward distance component between the target vehicle 310 and the host vehicle 200 on the basis of a ratio of the width occupied by the image of the rear surface of the target vehicle 310 in the bounding box 320 and the width of the bounding box 320 based on the calculated world width.

In operation S709, the ISP 120 may again calculate a α value by using either the minimum world width or the maximum world width as the initial world width Wo. For example, when the world width calculated in operation S706 is greater than the desired maximum world width, the ISP 120 may set a value of the calculated world width to the desired maximum world width value, calculate the α value, and correct the k value, but the example embodiments are not limited thereto. As another example, when the calculated world width is less than the desired minimum world width, the ISP 120 may set the value of the calculated world width to the desired minimum world width value, etc.

Figure 8:
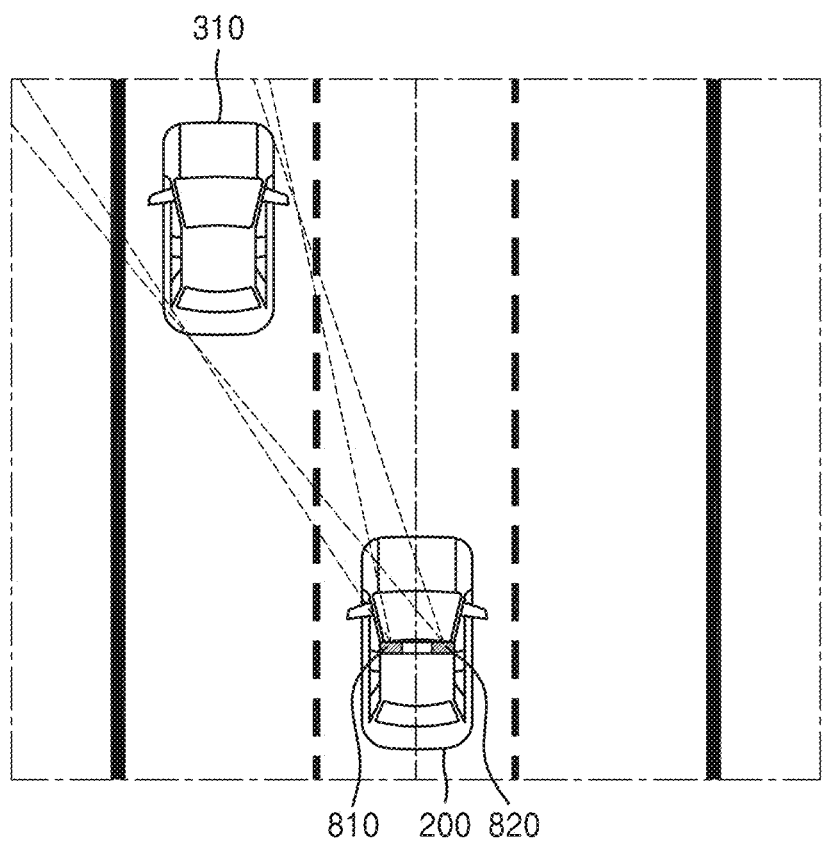
FIG. 8 illustrates a birds-eye view of a host vehicle including a plurality of distance estimation apparatuses according to at least one example embodiment.

FIG. 8 illustrates a birds-eye view of a host vehicle 200 including a plurality of distance estimation apparatuses according to at least one example embodiment.

Referring to FIG. 8, the host vehicle 200 may include a plurality of distance estimation apparatuses. For example, the host vehicle 200 may include a first distance estimation apparatus 810 and a second distance estimation apparatus 820, but is not limited thereto. According to other example embodiments, the host vehicle 200 may include more distance estimation apparatuses, and each of the distance estimation apparatuses may be disposed to obtain images of other areas surrounding the host vehicle 200, such as a lateral (e.g., left and/or right) region, a backward (e.g., rear) region, etc., as well as an image of target vehicle(s) 310 located in a forward region.

As illustrated in FIG. 8, according to at least one example embodiment, the ISP 120 may estimate a forward distance to the target vehicle 310 on the basis of at least one of information obtained by the first distance estimation apparatus 810 and information obtained by the second distance estimation apparatus 820. For example, the ISP 120 may estimate a forward distance to the target vehicle 310 on the basis of at least one of a first world width obtained from the first distance estimation apparatus 810 and a second world width obtained from the second distance estimation apparatus 820. The first distance estimation apparatus 810 may calculate the world width of the target vehicle 310 on the basis of a k1 value, and the second distance estimation apparatus 820 may calculate the world width of the target vehicle 310 on the basis of a k2 value.

For example, a value of the world width calculated based on the k1 value by the first distance estimation apparatus 810 may be within a desired world width range, such as between a desired minimum world width to a desired maximum world width, and moreover, a value of the world width calculated based on the k2 value by the second distance estimation apparatus 820 may be within the desired world width range, e.g., from the desired minimum world width to the desired maximum world width. In this case, the ISP 120 may use a forward distance value obtained using each of the first distance estimation apparatus 810 and/or the second distance estimation apparatus 820. That is, the ISP 120 may determine a first forward distance obtained by the first distance estimation apparatus 810 as a distance between the host vehicle 200 and the target vehicle 310, determine a second forward distance obtained by the second distance estimation apparatus 820 as a distance between the host vehicle 200 and the target vehicle 310, and determine a value, obtained by calculating an average of the first forward distance and the second forward distance, as a distance between the host vehicle 200 and the target vehicle 310.

As another example, the value of the world width calculated based on the k1 value by the first distance estimation apparatus 810 may be less than the desired minimum world width or greater than the desired maximum world width. The value of the world width calculated based on the k2 value by the second distance estimation apparatus 820 may be within the desired world width range, e.g., between the minimum world width and the maximum world width. In this case, the ISP 120 may determine the k1 value of the first distance estimation apparatus 810 as an inappropriate value and may determine (e.g., use) the world width obtained using the second distance estimation apparatus 820, as the world width of the target vehicle 310. The ISP 120 may calculate a forward distance to the target vehicle 310 by using the world width calculated by the second distance estimation apparatus 820. In the above-described example embodiment, an example where the k1 value of the first distance estimation apparatus 810 is inappropriate and the k2 value of the second distance estimation apparatus 820 is appropriate is illustrated, but the present example embodiment is not limited thereto. For example, when the k2 value of the second distance estimation apparatus 820 is inappropriate and the k1 value of the first distance estimation apparatus 810 is appropriate, the ISP 120 may determine (e.g., use) the world width obtained using the first distance estimation apparatus 810 as the world width of the target vehicle 310, and may estimate a distance between the target vehicle 310 and the host vehicle 200 on the basis of the determined world width.

Figure 9:
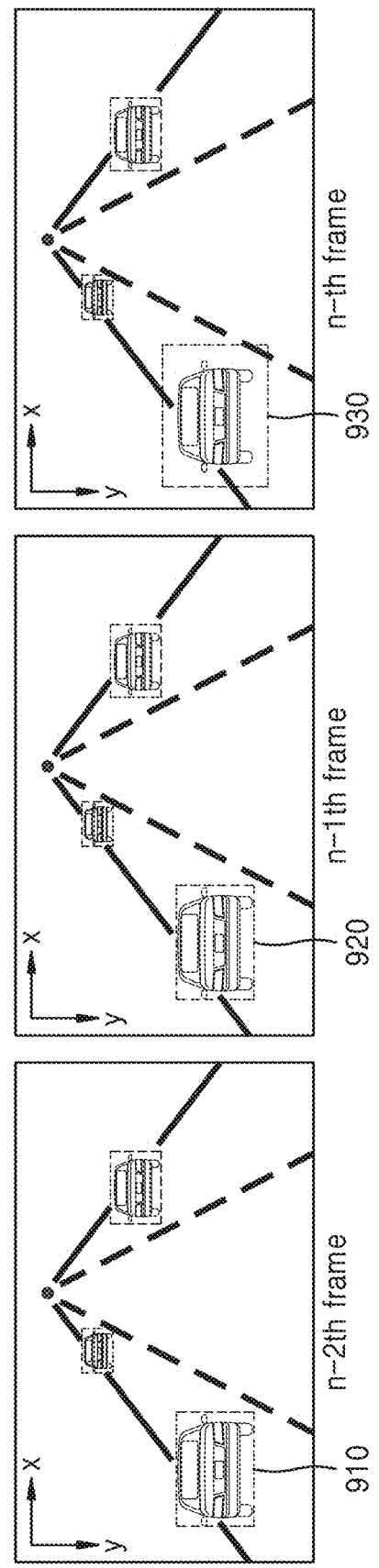
FIG. 9 illustrates an example of continuous refinement performed on a bounding box according to at least one example embodiment.

FIG. 9 illustrates an example of continuous refinement performed on a bounding box according to at least one example embodiment.

Referring to FIG. 9, the distance estimation apparatus 100 may obtain continuous images (e.g., a plurality of images, a sequence of images, etc.) based on continuous driving. As an example, when the host vehicle 200 is driving in a lane, the host vehicle 200 may obtain continuous images of three forward target vehicles by using the camera 110. In the example, the host vehicle 200 may continuously obtain images of forward target vehicles from an $n-2^{th}$ frame to an $n^{th}$ frame corresponding to a current frame over time.

According to various example embodiments, the ISP 120 may detect a bounding box 930 of the $n^{th}$ frame corresponding to a current time. In the $n-2^{th}$ frame or an $n-1^{th}$ frame corresponding to preceding times, bounding boxes 910 and 920 may be set to include a desired minimum region corresponding to a target vehicle, but the bounding box 930 of the $n^{th}$ frame may be set to include a region corresponding to a target vehicle and a peripheral region of the target vehicle. In this case, as described above, the distance estimation apparatus 100 according to at least one example embodiment may estimate a forward distance to a target vehicle on the basis of a pixel width of a detected bounding box, and thus, when the bounding box is set to include an undesired peripheral region of the target vehicle like the bounding box 930 of the $n^{th}$ frame, a magnitude of a pixel width (e.g., the pixel width value) of the bounding box 930 may be inaccurate, and therefore a forward distance estimated based on the inaccurate magnitude of the pixel width may be inaccurate.

According to various example embodiments, the ISP 120 may determine the credibility of a bounding box (for example, the bounding box 930 of the $n^{th}$ frame) obtained in a current-time frame by using (e.g., based on) an average value of pixel widths of bounding boxes (for example, the bounding box 910 of the $n-2^{th}$ frame and the bounding box 910 of the $n-1^{th}$ frame) obtained in previous-time frames (e.g., in preceding image frames, older image frames, etc.). When a pixel width of each of bounding boxes detected from previous-time frames is x, a pixel width of a bounding box detected from a current-time frame is y, and a difference between x and y is greater than a desired threshold value, the ISP 120 may determine that an error has occurred in determining a size (e.g., pixel width) of the bounding box detected in the current-time frame (e.g., the current image frame). For example, when a pixel width of the bounding box 910 detected from the $n-2^{th}$ frame is 90, a pixel width of the bounding box 920 detected from the $n-1^{th}$ frame is 91, and a pixel width of the bounding box 910 detected from the $n^{th}$ frame is 120, the ISP 120 may determine that an error occurred in a process of detecting the bounding box 930 if the difference between the pixel width of the n–2th frame and the $n^{th}$ frame is greater than the desired threshold value. The desired threshold value may be set based on experiential data and/or may be set by a user. This is because, in a continuous driving process, a size of a bounding box corresponding to a parallel driving target vehicle is impossible to rapidly increase between one or some frame time intervals. Additionally, the ISP 120 may determine that an error occurred in estimating a forward distance to a target vehicle, based on a calculated world width as well as the pixel widths of the bounding boxes 910, 920, and 930 corresponding to continuous time flow, if the difference between the pixel width of any of the preceding image frames and the current image frame exceeds the desired threshold value.

According to various example embodiments, the ISP 120 may correct the image of a current-time image frame on the basis of image frame(s) corresponding to at least one previous time. For example, the ISP 120 may perform image filtering, such as low pass filtering, Kalman filtering, etc., on a world width calculated from a current frame. In a case which uses the low pass filtering or the Kalman filtering, the ISP 120 may correct the pixel width of the bounding box 930 detected to be greater or less than a real pixel width in the $n^{th}$ frame, or may correct a world width calculated based on the pixel width of the bounding box 930 detected to be greater or less than the real pixel width, etc.

According to various example embodiments, the host vehicle 200 may calculate a forward distance to the target vehicle 310, and may control the host vehicle 200 on the basis of a result of the calculation. For example, the host vehicle 200 may further include an autonomous driving controller (not shown) as well as the vehicle controller 210. The autonomous driving controller (not shown) may reflect the calculation result in generating a driving path of the host vehicle 200, determining a driving direction of the host vehicle 200, and changing a lane (e.g., steering the vehicle) or increasing or decreasing a velocity of the host vehicle 200 (e.g., applying the brakes or accelerator of the vehicle).

According to various example embodiments, the autonomous driving controller (not shown) may determine a risk level of the target vehicle 310 on the basis of the forward distance and a lateral distance to the target vehicle 310, adjust a velocity of the host vehicle 200 by using the vehicle controller 210 on the basis of the risk level, and change a lane of the host vehicle 200 with respect to a lane of the target vehicle 310 on the basis of the risk level. The autonomous driving controller (not shown) may determine whether a current case corresponds to a case where the forward distance to the target vehicle 310 is less than a desired and/or predefined distance, a case where the number of lanes to be changed by the target vehicle 310 is large as a determination result based on Δx, or a case where the target vehicle 310 is a vehicle type having a possibility that loaded goods are dropped onto a driving road, etc., and may calculate a risk level of the target vehicle 310 on the basis of determination results. The autonomous driving controller (not shown) may control driving of the host vehicle 200 on the basis of a risk level, and thus, may stably prepare for the risk of a sudden accident, collision, etc., caused by peripheral vehicles. According to some example embodiments, the autonomous driving controller may be integrated with and/or provide the functionality of the vehicle controller 210 and/or the ISP 120, or vice versa. The autonomous driving controller may include processing circuitry such as hardware including logic circuits; a hardware/software combination such as at least one processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been particularly shown and described with reference to various example embodiments thereof, it will be understood that various changes in form and details may be made therein without departing from the spirit and scope of the following claims.

What is claimed is:

1. An operating method of a distance estimation apparatus including at least one camera, the operating method comprising:
generating, using processing circuitry, a bounding box corresponding to a target vehicle based on an image obtained using the at least one camera;
determining, using the processing circuitry, a first rectilinear distance to the target vehicle;
calculating, using the processing circuitry, a first world width of the target vehicle based on the first rectilinear distance and a width of the bounding box;
calculating, using the processing circuitry, a first ratio, the first ratio based on a width of a rear surface of the target vehicle and a width of a side surface of the target vehicle in the obtained image;
calculating, using the processing circuitry, a second ratio, the second ratio corresponding to a rear surface of the target vehicle, the second ratio based on a width of the bounding box and the first ratio;
calculating, using the processing circuitry, a second world width of the target vehicle based on the second ratio; and
calculating, using the processing circuitry, an estimated distance to the target vehicle based on the second world width and the second ratio.

2. The operating method of claim 1, further comprising:
determining, using the processing circuitry, whether a value of the second world width is less than a desired minimum world width or greater than a desired maximum world width.

3. The operating method of claim 2, further comprising:
in response to the second world width being less than the desired minimum world width, changing, using the processing circuitry, the value of the second world width to a value of the desired minimum world width;
in response to the second world width being greater than the desired maximum world width, changing, using the processing circuitry, the value of the second world width to a value of the desired maximum world width; and
in response to the value of the second world width being changed to the value of the desired minimum world width or the value of the desired maximum world width, calculating using the processing circuitry, the second ratio based on the changed second world width value.

4. The operating method of claim 1, further comprising:
determining, using the processing circuitry, the first rectilinear distance and the first world width based on the target vehicle being located in a forward region.

5. The operating method of claim 1, further comprising:
determining, using the processing circuitry, the first rectilinear distance based on a height of the at least one camera, a focal distance of the at least one camera, and a vertical distance between a lower end of the bounding box and a vanishing point of the obtained image.

6. The operating method of claim 5, further comprising:
determining, using the processing circuitry, the first world width based on the focal distance, a width of the bounding box, and the first rectilinear distance.

7. The operating method of claim 5, further comprising:
determining, using the processing circuitry, a pixel-width of a rear region of the target vehicle in the bounding box based on the second ratio;
calculating, using the processing circuitry, a forward-distance component of a distance between the distance estimation apparatus and the target vehicle based on the determined pixel-width of the rear region, the focal distance, and the second world width; and
calculating, using the processing circuitry, a lateral distance component of the distance between the distance estimation apparatus and the target vehicle based on a distance between an optical axis of the at least one camera and the bounding box, the focal distance, and the forward distance component.

8. The operating method of claim 1, wherein,
in response to an optical axis of the at least one camera being within a left-right range of the bounding box, determining, using the processing circuitry, whether the target vehicle and the distance estimation apparatus are located in the same lane.

9. The operating method of claim 1, further comprising:
determining, using the processing circuitry, a vehicle type of the target vehicle from a plurality of vehicle types based on the obtained image; and
setting, using the processing circuitry, a value of a third ratio based on the determined vehicle type corresponding to the target vehicle, the third ratio corresponding to real-world lengths of a side surface and a rear surface of the target vehicle,
wherein the value of the third ratio is different for each of the plurality of vehicle types.

10. A distance estimation apparatus comprising:
at least one camera configured to obtain at least one image associated with a target vehicle; and
processing circuitry configured to,
generate a bounding box corresponding to a target vehicle,
determine a first rectilinear distance to the target vehicle,
calculate a first world width of the target vehicle based on the first rectilinear distance and a width of the bounding box,
calculate a first ratio, the first ratio based on a width of a rear surface of the target vehicle and a width of a side surface of the target vehicle in the obtained image,
calculate a second ratio, the second ratio corresponding to a rear surface of the target vehicle, the second ratio based on the a width of the bounding box and the first ratio,
calculate a second world width of the target vehicle based on the second ratio,
calculate an estimated distance to the target vehicle based on the second world width and the second ratio, and
output the estimated distance to a host vehicle.

11. The distance estimation apparatus of claim 10, wherein the processing circuitry is further configured to:
determine whether a value of the second world width is less than a desired minimum world width or greater than a desired maximum world width.

12. The distance estimation apparatus of claim 11, wherein the processing circuitry is further configured to:
in response to the second world width being less than the desired minimum world width, change the value of the second world width to a value of the desired minimum world width; and
in response to the second world width being greater than the desired maximum world width, change the value of the second world width to a value of the desired maximum world width.

13. The distance estimation apparatus of claim 12, wherein the processing circuitry is further configured to:
in response to the value of the second world width being changed to the value of the desired minimum world width or the value of the desired maximum world width, calculate the second ratio based on a changed second world width value.

14. The distance estimation apparatus of claim 10, wherein the processing circuitry is further configured to:
determine the first rectilinear distance and the first world width based on the target vehicle being located in a forward region.

15. The distance estimation apparatus of claim 10, wherein the processing circuitry is further configured to:
determine the first rectilinear distance based on a height of the at least one camera, a focal distance of the at least one camera, and a vertical distance between a lower end of the bounding box and a vanishing point of the obtained image.

16. The distance estimation apparatus of claim 15, wherein the processing circuitry is further configured to:
determine the first world width based on the focal distance, a width of the bounding box, and the first rectilinear distance.

17. The distance estimation apparatus of claim 15, wherein the processing circuitry is further configured to:
determine a pixel-width of a rear region of the target vehicle in the bounding box based on the second ratio,
calculate a forward-distance component of a distance between the distance estimation apparatus and the target vehicle based on the determined pixel-width of the rear region, the focal distance, and the second world width, and
calculate a lateral distance component of the distance between the distance estimation apparatus and the target vehicle based on a distance between an optical axis of the at least one camera and the bounding box, the focal distance, and the calculated forward distance component.

18. The distance estimation apparatus of claim 10, wherein the processing circuitry is further configured to:
in response to an optical axis of the at least one camera being within a left-right range of the bounding box, determine whether the target vehicle and the distance estimation apparatus are located in the same lane.

19. The distance estimation apparatus of claim 10, wherein the processing circuitry is further configured to:
determine a vehicle type of the target vehicle from a plurality of vehicle types based on the obtained image; and
set a value of a third ratio based on the determined vehicle type corresponding to the target vehicle, the third ratio corresponding to real world lengths of a side surface and a rear surface of the target vehicle,
wherein the value of the third ratio is different for each of the plurality of vehicle types.

20. A host vehicle apparatus comprising:
at least one camera configured to obtain at least one image associated with a target vehicle; and
processing circuitry configured to,
generate a bounding box corresponding to a target vehicle,
determine a first rectilinear distance to the target vehicle,
calculate a first world width of the target vehicle based on the first rectilinear distance and a width of the bounding box,
calculate a first ratio, the first ratio based on a width of a rear surface of the target vehicle and a width of a side surface of the target vehicle in the obtained image,
calculate a second ratio, the second ratio corresponding to a rear surface of the target vehicle, the second ratio based on a width of the bounding box and the first ratio,
calculate a second world width of the target vehicle based on the second ratio,
estimate a forward distance and a lateral distance to the target vehicle based on the second world width and the second ratio, and
control the host vehicle apparatus based on the estimated forward distance and lateral distance.

* * * * *